(12) United States Patent
Brochard et al.

(10) Patent No.: US 12,053,915 B2
(45) Date of Patent: Aug. 6, 2024

(54) METHOD FOR MANUFACTURING A DOOR OF A THRUST REVERSAL SYSTEM

(71) Applicant: Airbus Operations SAS, Toulouse (FR)

(72) Inventors: Wolfgang Brochard, Toulouse (FR); Laurent Cazeaux, Toulouse (FR); Florian Ravise, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 17/953,553

(22) Filed: Sep. 27, 2022

(65) Prior Publication Data
US 2023/0103118 A1    Mar. 30, 2023

(30) Foreign Application Priority Data

Sep. 29, 2021    (FR) ........................................ 2110267

(51) Int. Cl.
| | |
|---|---|
| B29C 45/14 | (2006.01) |
| B29C 45/00 | (2006.01) |
| B29C 51/00 | (2006.01) |
| F02K 1/62 | (2006.01) |
| B29K 105/16 | (2006.01) |
| B29K 671/00 | (2006.01) |
| B29L 31/30 | (2006.01) |

(52) U.S. Cl.
CPC .... *B29C 45/14786* (2013.01); *B29C 45/0013* (2013.01); *B29C 45/0053* (2013.01); *B29C 45/14* (2013.01); *B29C 45/14065* (2013.01); *B29C 45/1418* (2013.01); *B29C 51/004* (2013.01); *F02K 1/62* (2013.01); *B29C 2045/14442* (2013.01); *B29K 2105/16* (2013.01); *B29K 2671/00* (2013.01); *B29L 2031/3076* (2013.01)

(58) Field of Classification Search
CPC .............. B29C 45/14786; B29C 45/14; B29C 2045/14442
See application file for complete search history.

(56) References Cited

U.S. PATENT DOCUMENTS

| | | | | |
|---|---|---|---|---|
| 5,575,147 | A * | 11/1996 | Nikkanen | ............... F02K 1/625 239/265.29 |
| 2016/0326985 | A1* | 11/2016 | Hercock | ................. F02K 1/625 |
| 2018/0058373 | A1* | 3/2018 | Gaw | ........................ F02K 1/70 |

(Continued)

FOREIGN PATENT DOCUMENTS

| | | | |
|---|---|---|---|
| CA | 2747372 | * | 7/2010 |
| CA | 2970697 | * | 2/2018 |

(Continued)

OTHER PUBLICATIONS

French Search Report dated Jun. 3, 2022; priority document.

*Primary Examiner* — Edmund H Lee
(74) *Attorney, Agent, or Firm* — Greer, Burns & Crain, Ltd.

(57) ABSTRACT

A door for a thrust reversal system, an aircraft with such a door, and a method for manufacturing a door of a thrust reversal system. The door comprises a wall formed from long fibers embedded in a thermoplastic resin matrix and a network of ribs overmolded on one of the faces of the wall. A propulsion assembly of an aircraft comprises a thrust reversal system having a plurality of such doors.

13 Claims, 6 Drawing Sheets

(56) References Cited

U.S. PATENT DOCUMENTS

| | | |
|---|---|---|
| 2020/0095955 A1 | 3/2020 | Davis |
| 2020/0291893 A1* | 9/2020 | Oliveux et al. |
| 2020/0392923 A1* | 12/2020 | Wilson et al. .... B29C 45/14336 |
| 2021/0239073 A1* | 8/2021 | Davis ........................ F02K 1/70 |

FOREIGN PATENT DOCUMENTS

| | | | |
|---|---|---|---|
| CA | 2971362 | * | 2/2018 |
| DE | 102004062331 | * | 6/2006 |
| EP | 3626958 | * | 3/2020 |
| EP | 3626958 A1 | | 3/2020 |
| EP | 3858584 A1 | | 8/2021 |
| WO | 2017182565 A1 | | 10/2017 |
| WO | 2019030454 A1 | | 2/2019 |

\* cited by examiner

METHOD FOR MANUFACTURING A DOOR OF A THRUST REVERSAL SYSTEM

CROSS-REFERENCES TO RELATED APPLICATIONS

This application claims the benefit of the French patent application No. 2110267 filed on Sep. 29, 2021, the entire disclosures of which are incorporated herein by way of reference.

BACKGROUND OF THE INVENTION

The present application relates to a method for manufacturing a door of a thrust reversal system and to a thrust reversal system door thus obtained. It relates also to an aircraft propulsion assembly comprising a thrust reversal system comprising several said doors.

DESCRIPTION OF THE PRIOR ART

According to an embodiment, which can be seen in FIGS. 1 to 4, an aircraft 10 comprises several propulsion assemblies 12 positioned under each of the wings 14 of the aircraft 10 and linked thereto by pylons 16. Each propulsion assembly 12 comprises a jet engine 18 positioned inside a nacelle 20.

Hereinafter in the description, a longitudinal direction is parallel to the axis of rotation A18 of the jet engine 18 and a radial direction is at right angles to the axis of rotation A18. A transverse plane is a plane at right angles to the axis of rotation A18. The notions of front/rear, denoted Av/Ar, refer to the direction of flow of an airstream 22 in the nacelle 20, the latter, represented in FIG. 1 by an arrow, flowing from the front (Av) to the rear (Ar).

Figure 1:
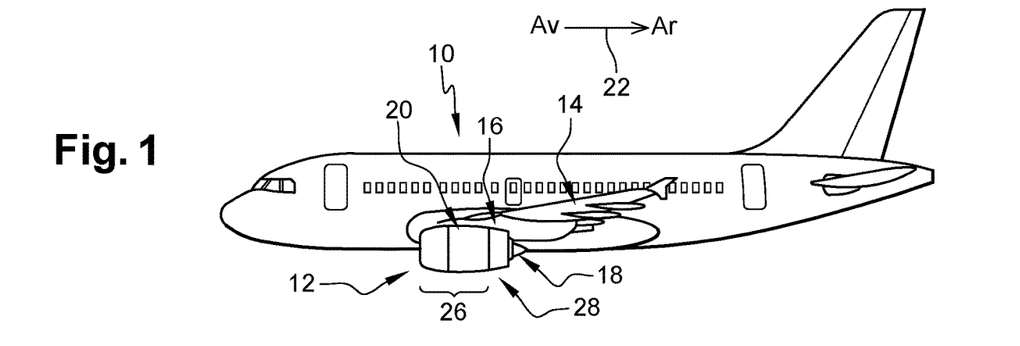
FIG. 1 is a lateral view of an aircraft.
Figure 2:
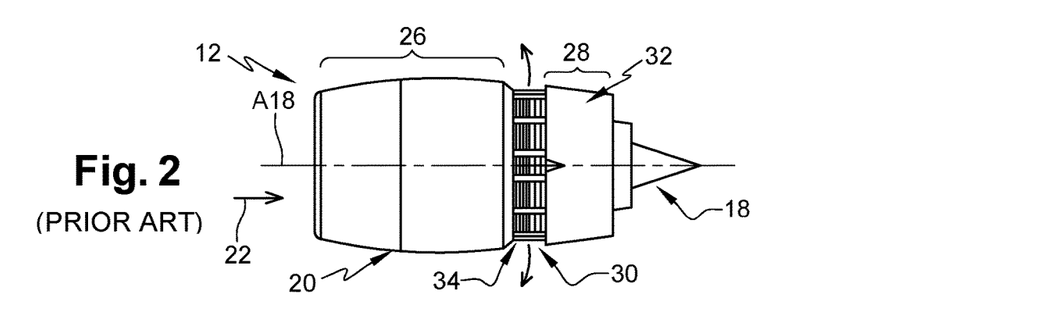
FIG. 2 is a lateral view of a propulsion assembly equipped with a thrust reversal system illustrating an embodiment of the prior art.

The nacelle 20 has an approximately tubular form and, with the jet engine 18, delimits an annular duct 24. It comprises, from the front to the rear, a front section 26 via which the airstream 22 enters and a rear section 28 via which the airstream 22 exits.

The nacelle 20 comprises a thrust reversal system 30 configured to occupy an activated state (visible in FIGS. 2 and 3) in which it deflects at least a part of the airstream 22 circulating in the annular duct 24 toward the outside and the front of the nacelle 20 and an inactivated state (visible in FIG. 1) in which it does not deflect the airstream 22 circulating in the annular duct 24.

The thrust reversal system 30 comprises at least one movable part 32 that makes it possible to generate at least one lateral aperture 34 (visible in FIGS. 2 and 3) toward which the deflected airstream is oriented.

According to one embodiment, the movable part 32 corresponds to the rear section 28 which is translated in the longitudinal direction between a closed position in which the rear section 28 is in contact with the front section 26 when the thrust reversal system 30 is in the inactivated state and an open position (visible in FIGS. 2 and 3) in which the rear section 28 is away from the front section 26 so as to generate the lateral opening (or openings) 34 when the thrust reversal system 30 is in the activated state.

The thrust reversal system 30 also comprises doors 36 configured to deflect at least a part of the airstream 22 circulating in the annular duct 24 toward a lateral aperture 34, and a plurality of cascades 38 positioned at the lateral aperture 34. These cascades 38 are configured to control the orientation of the stream deflected by the doors 36.

Figure 3:
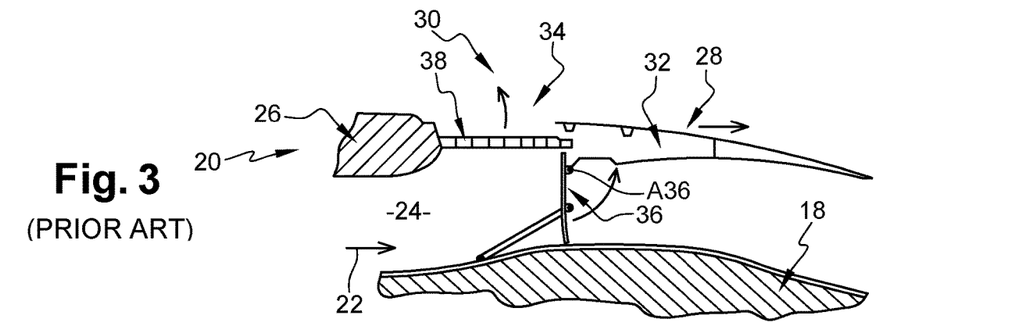
FIG. 3 is a longitudinal cross section of a part of a propulsion assembly equipped with a thrust reversal system illustrating an embodiment of the prior art.

Each door 36 is movable between a folded-back position when the thrust reversal system 30 is in the inactivated state and the movable part 32 is in the closed position, in which the door 36 is pressed against the movable part 32, and a deployed position, visible in FIG. 3, when the thrust reversal system 30 is in the activated state and the movable part 32 is in the open position, in which the door 36 extends across the annular duct 24 to deflect at least a part of the airstream 22 circulating therein toward the lateral aperture 34.

According to one configuration, each door 36 is mounted to pivot about an axis of rotation A36 substantially at right angles to the axis of rotation A18 and to a radial direction.

Figure 4:
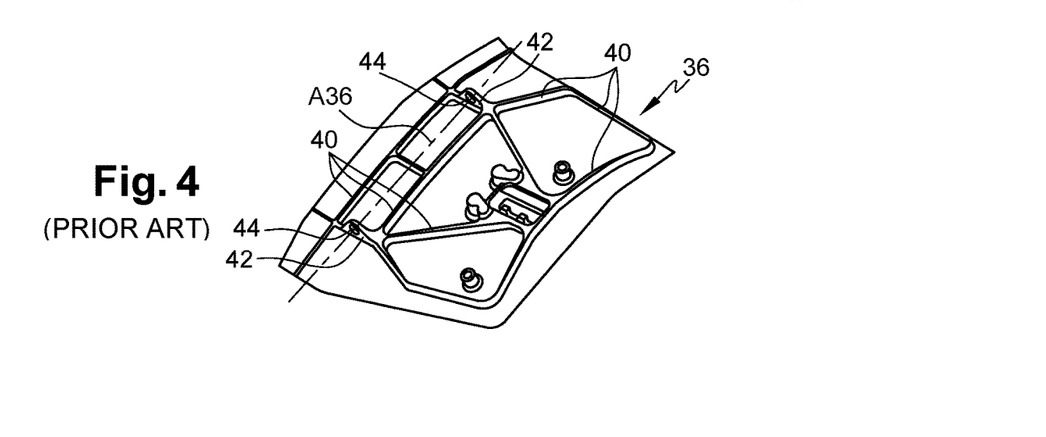
FIG. 4 is a perspective view of a door of a thrust reversal system illustrating an embodiment of the prior art.

According to a first embodiment visible in FIG. 4, the door 36 is metallic and has a plate reinforced on one of its faces by a network of ribs 40. The latter incorporates two link lugs 42, each of which has an orifice 44 configured to house the axis of rotation A36 of the door 36. This door 36 is produced from a plate in which the network of ribs 40 and the link lugs 42 are machined.

This first embodiment is not satisfactory because the production of the network of ribs 40 and of the link lugs 42 generates a significant volume of chips.

The present invention aims to remedy all or some of the drawbacks of the prior art.

SUMMARY OF THE INVENTION

To this end, the subject of the invention is a method for manufacturing a door of a thrust reversal system of an aircraft, said door comprising:
  at least one first wall comprising a first face configured to be in contact with an airstream to be deflected and a second face,
  a network of ribs positioned on the second face of the first wall.

According to the invention, the manufacturing method comprises a step of obtaining the first wall produced in at least one composite material comprising long fibers embedded in a thermoplastic resin matrix and a step of overmolding of the network of ribs on the second face of the first wall by injecting at least one resin.

This manufacturing method makes it possible to produce doors of a thrust reversal system simply and economically while limiting the waste.

According to another feature, the network of ribs comprises a first face in contact with the first wall, a second face opposite the first face and cells delimited by the ribs of the network of ribs and open on the first and second faces. In addition, during the overmolding step, the first wall is positioned in a mold comprising a first contact surface against which the first face of the first wall is pressed and a second contact surface spaced apart from the second face of the first wall and formed as the second face of the network of ribs to be obtained, the mold comprising, for each cell, a die protruding with respect to the second contact surface and configured to come into contact with the first wall upon the injection of resin.

According to another feature, the first wall and/or the mold are preheated or heated to promote the injection of resin between the dies and the adhesion of the network of ribs on the first wall.

According to another feature, the manufacturing method comprises a step of placement of at least one insert in the mold prior to the overmolding step, the mold being configured to keep the insert (or inserts) immobile.

According to another feature, the manufacturing method comprises a step of thermoforming of the first wall before the overmolding step.

According to another feature, the manufacturing method comprises a step of production of at least one orifice passing through the first wall prior to the overmolding step.

According to another feature, the manufacturing method comprises a step of obtaining of a second wall then a step of fixing of the second wall against the network of ribs and possibly the first wall.

According to another feature, the second wall is made of a composite material comprising long fibers embedded in a thermoplastic resin matrix. In addition, during the step of fixing of the second wall, at least the second wall and the network of ribs are heated and the second wall is pressed against at least the network of ribs.

According to another feature, the resin of the network of ribs is a thermoplastic resin and comprises at least one filler.

According to another feature, the network of ribs clearing a part of the second face of the first wall, the method comprises a step of cutting of a zone of the first wall not covered by the network of ribs according to a desired length for the door.

Also a subject of the invention is a thrust reversal system door obtained from the manufacturing method according to one of the preceding features.

According to another feature, the door comprises at least one through-orifice which has an axis substantially at right angles to at least one of the first and second faces of the door.

According to another feature, the network of ribs clears a part of the second face of the first wall situated at a second end distant from the through-orifice.

According to another feature, the network of ribs has a constant thickness over a zone in which the through-orifice is situated and then a thickness which decreases progressively in moving away from the through-orifice.

According to another feature, the door comprises at least one tubular metal insert delimiting the through-orifice.

According to another feature, the door comprises first and second walls. The network of ribs comprises a first face in contact with the first wall, a second face opposite the first face and in contact with the second wall and cells delimited by the ribs of the network of ribs and open on the first and second faces. In addition, the first wall is porous and allows at least some acoustic waves to pass, the second wall is impermeable to the acoustic waves and the cells of the network of ribs are dimensioned according to the acoustic properties sought.

Finally, also a subject of the invention is an aircraft propulsion assembly comprising at least one thrust reversal system comprising several doors according to one of the preceding features.

BRIEF DESCRIPTION OF THE DRAWINGS

Other features and advantages will emerge from the following description of the invention, a description given purely by way of example, in light of the attached drawings in which.

DESCRIPTION OF THE PREFERRED EMBODIMENTS

Figure 5:
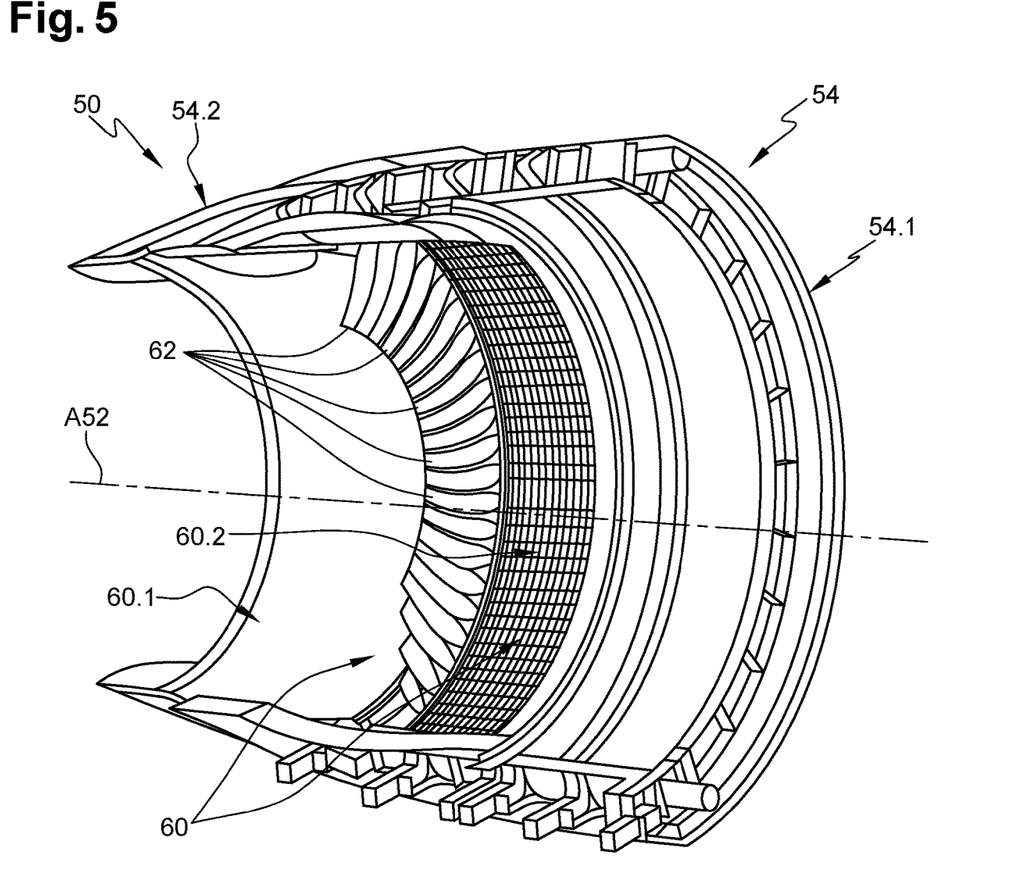
FIG. 5 is a perspective view of a part of a propulsion assembly of an aircraft equipped with a thrust reversal system illustrating an embodiment of the invention.
Figure 6:
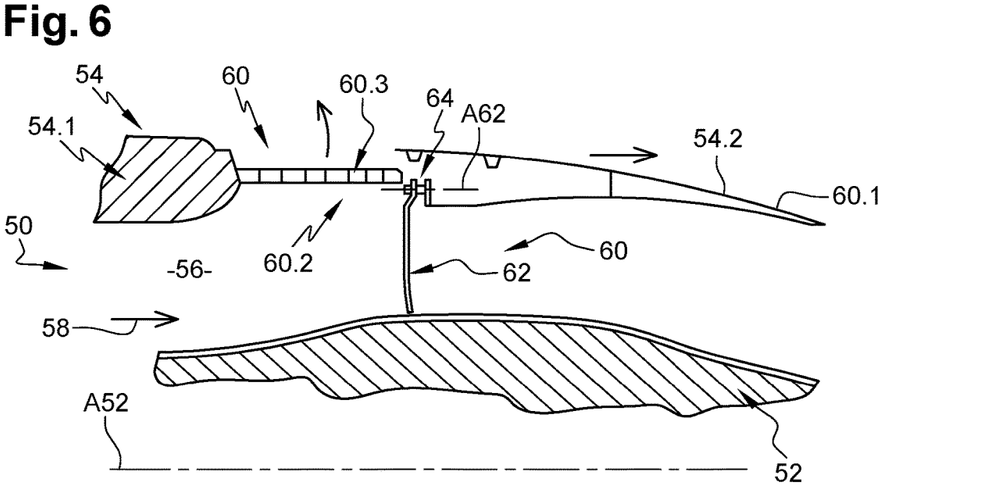
FIG. 6 is a longitudinal cross section of a part of a propulsion assembly equipped with a thrust reversal system illustrating an embodiment of the invention.

According to an embodiment visible in FIGS. 5 and 6, a propulsion assembly 50 of an aircraft comprises a jet engine 52 positioned inside a nacelle 54. The jet engine 52 has an axis of rotation A52. The nacelle 54 has an approximately tubular form and, with the jet engine 52, delimits an annular duct 56. The nacelle 54 comprises a front part 54.1 via which an airstream 58 circulating in the annular duct 56 enters and a rear part 54.2 via which the airstream 58 exits.

This propulsion assembly 50 comprises at least one thrust reversal system 60 configured to occupy an activated state (visible in FIGS. 5 and 6) in which it deflects at least a part of the airstream 58 circulating in the annular duct 56 toward the outside and the front of the nacelle 54 and an inactivated state in which it does not deflect the airstream 58 circulating in the annular duct 56.

The thrust reversal system 60 comprises at least one movable part 60.1 that makes it possible to generate at least one lateral aperture 60.2 toward which the deflected airstream is oriented.

According to one embodiment, the movable part 60.1 corresponds to the rear part 54.2 of the nacelle 54 which is translated in the longitudinal direction between a closed position in which the rear part 54.2 is in contact with the front part 54.1 when the thrust reversal system 60 is in the inactivated state and an open position in which the rear part 54.2 is away from the front part 54.1 so as to generate the lateral aperture (or apertures) 60.2 when the thrust reversal system 60 is in the activated state.

The thrust reversal system 60 can comprise at least one cascade 60.3 positioned at the lateral aperture 60.2 and configured to control the orientation of the deflected airstream.

Obviously, the invention is not limited to this embodiment for the movable part 60.1, the aperture 60.2 and the cascade 60.3 of the thrust reversal system 60. These elements are not described further because they can be identical to those of the prior art.

The thrust reversal system 60 also comprises several doors 62 configured to occupy a deployed state (visible in FIGS. 5 and 6) in which they protrude into the annular duct 56 and deflect at least a part of the airstream 58 circulating in the annular duct 56 toward a lateral aperture 60.2 and a folded-back state in which they do not protrude into the annular duct 56 and do not deflect the airstream 58.

Each door 62 is linked to a support from among the jet engine 52 and the nacelle 54 by an articulation 64 having a pivoting axis A62. All the doors 62 can be linked to the same support, for example the nacelle 54, or some doors 62 can be linked to the jet engine 52 and others to the nacelle 54.

According to a particular feature of the invention, the pivoting axis A62 is substantially parallel to the axis of rotation A52 of the jet engine 52. Thus, each door 62 can pivot in an approximately transverse plane (at right angles to the axis of rotation A52 of the jet engine 52) between the deployed and folded-back states.

Each door 62 has a first face F1 intended to be oriented toward the front of the nacelle 54 when the door 62 is in the deployed state and a second face F2 opposite the first face F1 and intended to be oriented toward the rear of the nacelle 54 when the door 62 is in the deployed state.

As illustrated in FIGS. 7 to 9 and 14, each door 62 takes the form of a blade 66 which has a first end 66.1 linked by the articulation 64 to the support, a second, so-called free, end 66.2 and two lateral edges 66.3, 66.4 linking the first and second ends 66.1, 66.2.

Each blade 66 has first and second faces which correspond to the first and second faces F1, F2 of the door 62 and are linked by a rim C. The latter forms the outline of the blade 66 and comprises a semi-circular portion at the first end 66.1, a substantially rectilinear portion at the second end 66.2 and substantially rectilinear portions at the lateral edges 66.3, 66.4. Obviously, the invention is not limited to this geometry for the blade 66.

Figure 9:
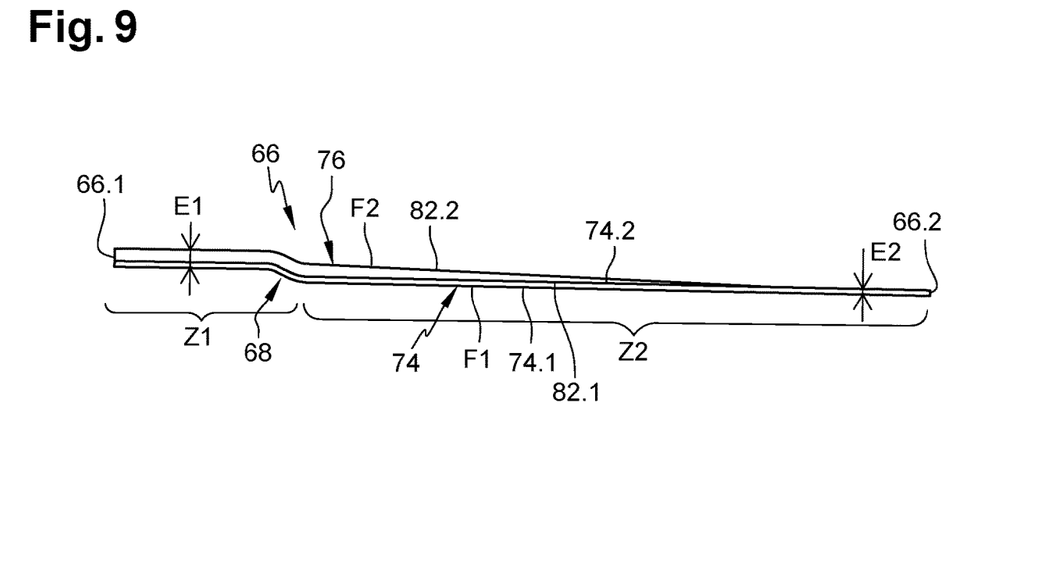
FIG. 9 is a lateral view of the door visible in FIG. 7.

The first and second faces F1, F2 of the door 62 or of the blade 66 can be substantially flat. As a variant, as illustrated in FIG. 9 for example, the first and second faces F1, F2 comprise a first flat zone Z1 at the first end 66.1, an alignment discontinuity 68 and then a second zone Z2 that is substantially flat or slightly curved between the alignment discontinuity 68 and the second end 66.2. According to one configuration, an alignment discontinuity 68 comprises successive plies, parallel to and at a short distance from one another. Obviously, the invention is not limited to this profile for the blade 66.

Each blade 66 has a first thickness E1 at the first end 66.1 and a second thickness E2, less than the first thickness E1, at the second end 66.2. According to one configuration, the first zone Z1 has a constant thickness equal to the first thickness E1. In addition, the second zone Z2 has a thickness which decreases progressively from the first thickness E1 at the continuity misalignment 68 to the second thickness E2 at the second end 66.2. Thus, the blade 66 has, at the articulation 64, a greater thickness than at its free end, which reinforces its mechanical characteristics. Obviously, the invention is not limited to this configuration for the thickness of the blade 66.

According to one embodiment, the door 62 has at least one through-orifice 70 emerging on the first and second faces F1, F2 of the door 62 (or of the blade 66), which has an axis A70 substantially at right angles to at least one of the first and second faces F1, F2, is positioned in proximity to the first end 66.1 and is configured to house a shaft forming the pivoting axis A62.

According to one configuration, the door 62 comprises at least one tubular metal insert 72 delimiting the through-orifice 70. According to one arrangement, this insert 72 has a tubular body 72.1 and at least one flange 72.2 provided at at least one end of the tubular body 72.1.

Figure 7:
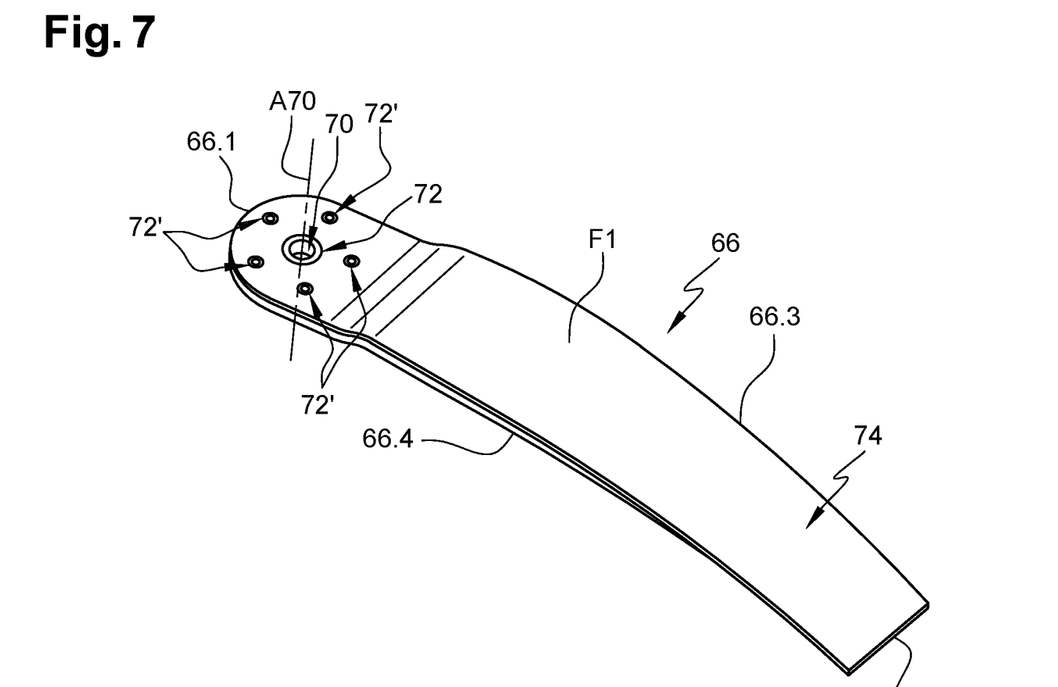
FIG. 7 is a perspective view from a first viewing angle of a door of a thrust reversal system illustrating a first embodiment of the invention.
Figure 11:
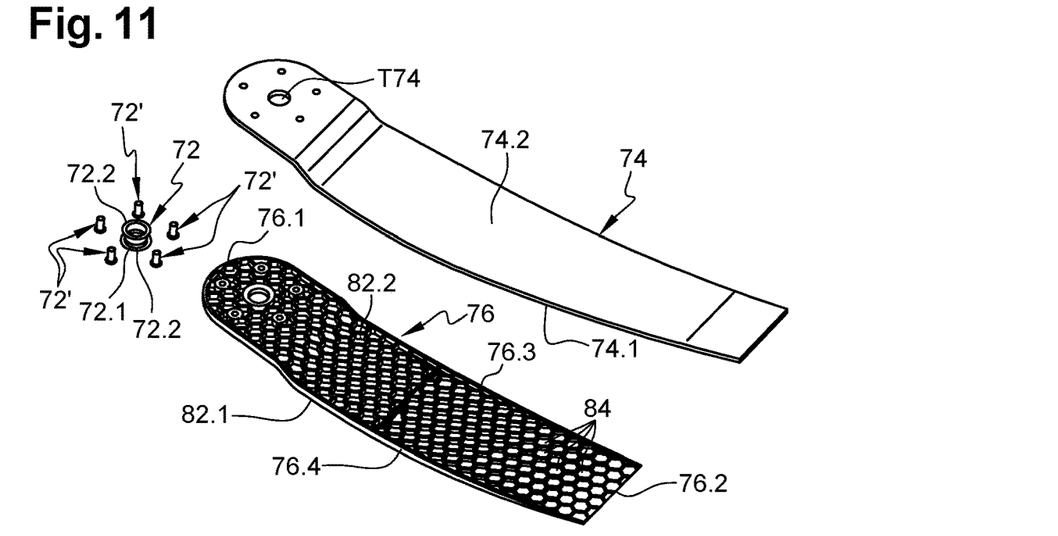
FIG. 11 is a perspective view of the different parts of a door illustrating the first embodiment.

As illustrated in FIGS. 7 and 11, the blade 66 comprises several inserts 72, 72', a main insert 72 forming the through-orifice 70 and several secondary inserts 72' provided around the main insert 72 and configured for example to allow screws to be screwed in.

Obviously, the invention is not limited to this embodiment for the insert or inserts 72, 72'.

The blade 66 comprises:
at least one first wall 74 made of composite material which comprises long fibers embedded in a thermoplastic resin matrix, said first wall 74 having first and second faces 74.1, 74.2, the first face 74.1 forming the first or second face F1, F2 of the blade 66,
a network of ribs 76 made of composite material positioned on the second face 74.2 of the first wall 74

According to a first embodiment visible in FIGS. 7 to 11, the blade 66 comprises a single first wall 74.

Figure 14:
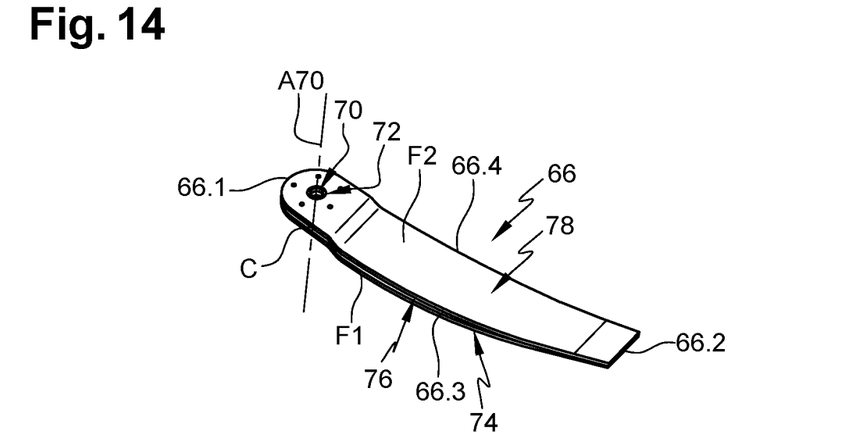
FIG. 14 is a perspective view of a door of a thrust reversal system illustrating a second embodiment of the invention.
Figure 15:
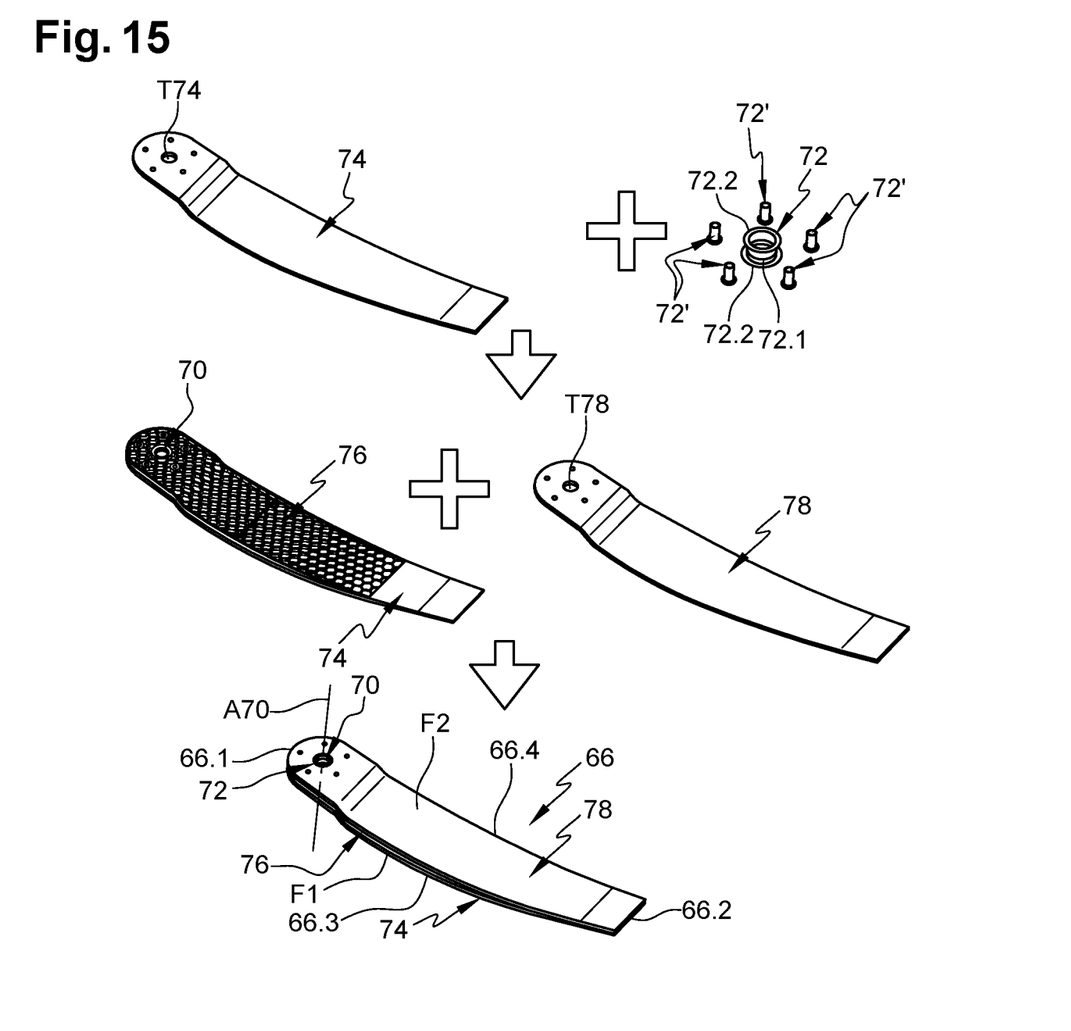
FIG. 15 is a perspective view of the different parts of a door illustrating the second embodiment.

According to a second embodiment visible in FIGS. 14 and 15, the blade 66 comprises a first wall 74 and a second wall 78 made of composite material, the network of ribs 76 being inserted between the first and second walls 74 and 78.

According to one configuration, the second wall 78 comprises long fibers embedded in a thermoplastic resin matrix.

Different materials can be used for the long fibers of the first and second walls 74, 78 which can be of carbon or of glass for example, and for the thermoplastic resin which can be a polyamide or polyether ether ketone (PEEK) resin, for example. Obviously, the invention is not limited to these materials for the fibers or the thermoplastic resin.

The long fibers of the first or second wall 74, 78 are oriented and arranged according to the mechanical characteristics desired for the first or second wall 74, 78.

Geometrically, the first wall 74 has an outline identical to that of the blade 66 to be obtained. The first wall 74 can have a substantially constant thickness, equal to the second thickness E2 of the blade 66.

The second wall 78 can have a substantially constant thickness and have a different outline to that of the blade 66 to be obtained and cover only the network of ribs 76.

Each of the first and second walls 74, 78 has a through-orifice T74, T78 corresponding to the through-orifice 70 of the blade 66.

According to one procedure, the first and second walls 74, 78 are obtained from a stacking of fiber plies, prepregnated or not. They can be obtained by a resin transfer molding technique, called RTM. The lay-up of the fiber plies can be performed on a flat surface and then, once consolidated, the first and second walls can be thermoformed. Other techniques can be envisaged for producing the first and second walls 74, 78.

According to a feature of the invention, the network of ribs 76 is obtained by overmolding of a resin on the second face 74.2 of the first wall 74.

According to one embodiment, the resin of the network of ribs 76 is a thermoplastic resin. According to one configuration, the same thermoplastic resin is used for the first wall 74 and the network of ribs 76.

According to one embodiment, the resin of the network of ribs 76 comprises at least one filler such as short fibers. As a variant, the resin of the network of ribs 76 can comprise a mix of different fillers such as short fibers, long fibers or the like. These fibers can be made from the same material as the long fibers of the first wall 74.

Figure 10:
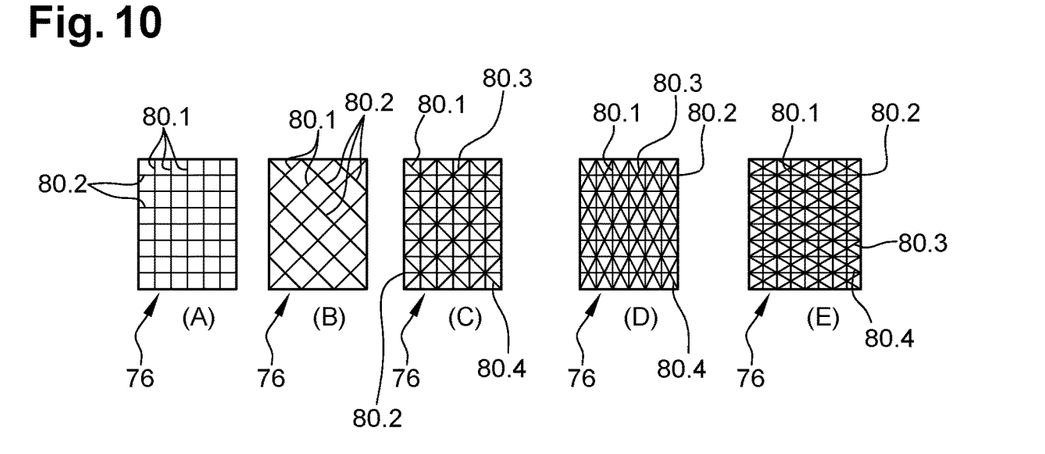
FIG. 10 is a top view of several networks of ribs illustrating different embodiments of the invention.

The network of ribs 76 can have different configurations according to the mechanical properties sought for the blade 66. As illustrated in FIG. 10, different arrangements can be envisaged.

According to a first arrangement (A), the network of ribs 76 comprises two series of ribs 80.1, 80.2, the ribs 80.1 of the first series being at right angles to the ribs 80.2 of the second series and parallel to the lateral edges 66.3, 66.4 of the blade 66.

According to a second arrangement (B), the network of ribs 76 comprises two series of ribs 80.1, 80.2, the ribs 80.1 of the first series being at right angles to the ribs 80.2 of the second series and forming an angle of approximately 45° with the lateral edges 66.3, 66.4 of the blade 66.

According to a third arrangement (C), the network of ribs comprises four series of ribs, the ribs 80.1 of the first series being parallel to the lateral edges 66.3, 66.4 of the blade 66, the ribs 80.2 of the second series being at right angles to the ribs 80.1 of the first series, the ribs 80.3 of the third series forming an angle of +45° with the ribs 80.1 of the first series, the ribs 80.4 of the fourth series forming an angle of −45° with the ribs 80.1 of the first series.

According to a fourth arrangement (D), the network of ribs comprises four series of ribs, the ribs 80.1 of the first series being parallel to the lateral edges 66.3, 66.4 of the blade 66, the ribs 80.2 of the second series being at right angles to the ribs 80.1 of the first series, the ribs 80.3 of the third series forming an angle of approximately +60° with the ribs 80.1 of the first series, the ribs 80.4 of the fourth series forming an angle of approximately −60° with the ribs 80.1 of the first series.

According to a fifth arrangement (E), the network of ribs comprises three series of ribs, the ribs 80.1 of the first series being parallel to the lateral edges 66.3, 66.4 of the blade 66, the ribs 80.2 of the second series forming an angle of +60° with the ribs 80.1 of the first series, the ribs 80.3 of the third series forming an angle of −60° with the ribs 80.1 of the first series.

Obviously, the invention is not limited to the arrangements visible in FIG. 10 for the network of ribs 76.

Figure 8:
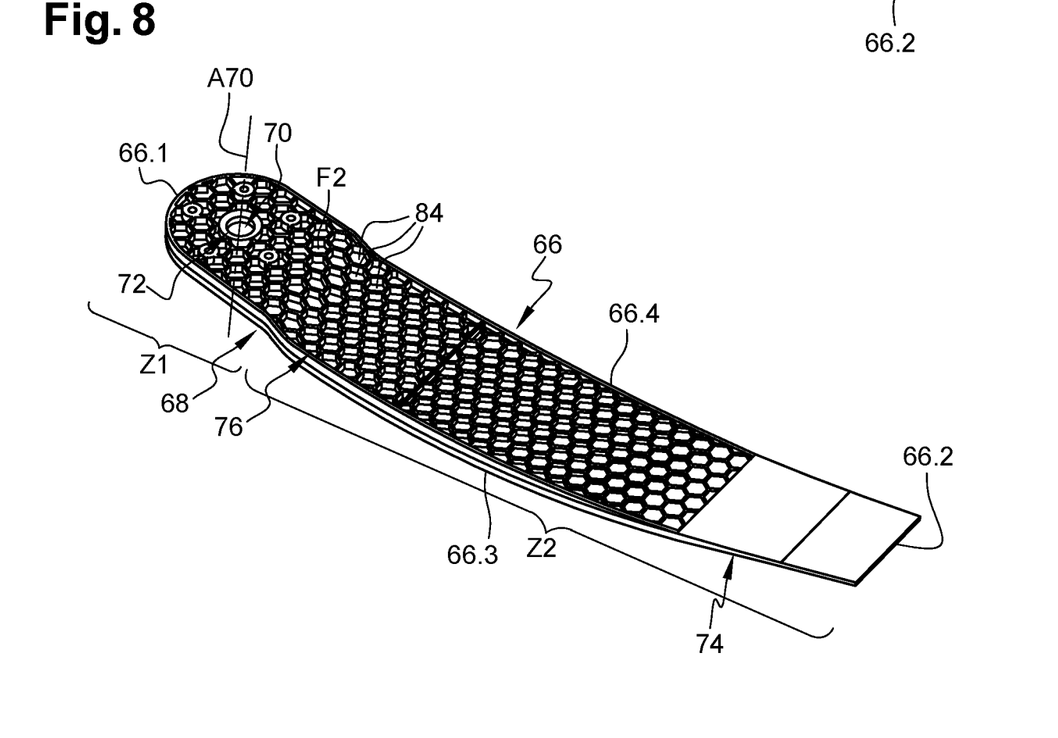
FIG. 8 is a perspective view from a second viewing angle of the door visible in FIG. 7.

As illustrated in FIG. 8, the network of ribs 76 comprises first and second ends 76.1, 76.2 and two lateral edges 76.3, 76.4 linking the first and second ends 76.1, 76.2. The network of ribs 76 has an outline which comprises a semicircular portion at the first end 76.1 identical to that of the first end 66.1 of the blade 66, a rectilinear portion at the second end 76.2 and substantially rectilinear portions at the lateral edges 76.3, 76.4 that are identical to the lateral edges 66.3, 66.4 of the blade 66.

According to one configuration, the network of ribs 76 has a length (distance between its first and second ends 76.1, 76.2) less than the length of the blade 66 (distance separating the first and second ends 66.1, 66.2 of the blade 66). According to this configuration, the first end 76.1 of the network of ribs 76 is positioned vertically in line with the first end 66.1 of the blade 66, the second end 76.2 being offset with respect to the second end 66.2 of the blade 66 toward the first end 76.1, as illustrated in FIG. 8. Thus, the network of ribs 76 clears a part of the second face 74.2 of the first wall 74 situated at the second end 66.2 of the blade 66 opposite the first end 66.1 at which the through-orifice 70 is positioned.

The network of ribs 76 has a constant thickness over a zone corresponding to the first zone Z1 of the blade 66 and then a thickness which decreases progressively in moving away from the through-orifice 70 to its second end 76.2. As an indication, the network of ribs 76 has a thickness of the order of 5 mm which decreases to a thickness of the order of 1 mm at the second end 76.2.

Whatever the embodiment, the network of ribs 76 comprises a first face 82.1 in contact with the second face 74.2 of the first wall 74 and a second face 82.2, opposite the first face 82.1, forming the second face of the blade 66 or in contact with the second wall 78. Between the ribs, the network of ribs 76 defines cells 84 that open on the first and second faces 82.1, 82.2. According to the variants, these cells 84 can be hexagonal as illustrated in FIG. 8, square and/or triangular as illustrated in FIG. 10.

According to one embodiment, the network of ribs 76 is configured according to the desired mechanical characteristics but also according to the desired acoustic treatment. According to this embodiment, the blade 66 comprises first and second walls 74, 78, one of the two walls, notably the first wall 74, being porous and allowing at least some acoustic waves to pass, the other wall, notably the second wall 78, being impermeable to the acoustic waves. The cells 84 of the network of ribs 76 are dimensioned according to the acoustic properties sought.

According to one procedure, the method for manufacturing a door 62 comprises a step of obtaining of the first wall 74 in at least one composite material comprising long fibers embedded in a thermoplastic resin matrix and then a step of overmolding of the network of ribs 76 on one of the faces of the first wall 74 by injecting at least one resin.

Before the overmolding step, the method for manufacturing a door 62 can comprise a thermoforming step aiming to shape the first wall 74, notably if the latter is flat at the end of the obtaining step. During the shaping step, the first wall 74 is heated and positioned between two plates shaped according to the profile desired for the first wall 74. The method for manufacturing a door 62 can comprise a step of production of at least one orifice T74 passing through the first wall 74, by drilling for example, and/or a trimming step aiming to machine the outline of the first wall 74.

Prior to the overmolding step, the method for manufacturing a door 62 comprises a step of placement of at least one insert 72, 72'.

According to one configuration, each insert 72, 72' is linked to the first wall 74 and/or to the network of ribs 76 by gluing or using the resin of the network of ribs 76. According to one embodiment, each insert 72, 72' is inserted into the network of ribs 76 and linked to at least one of the first and second walls 74, 78 using the network of ribs 76.

Figure 12:
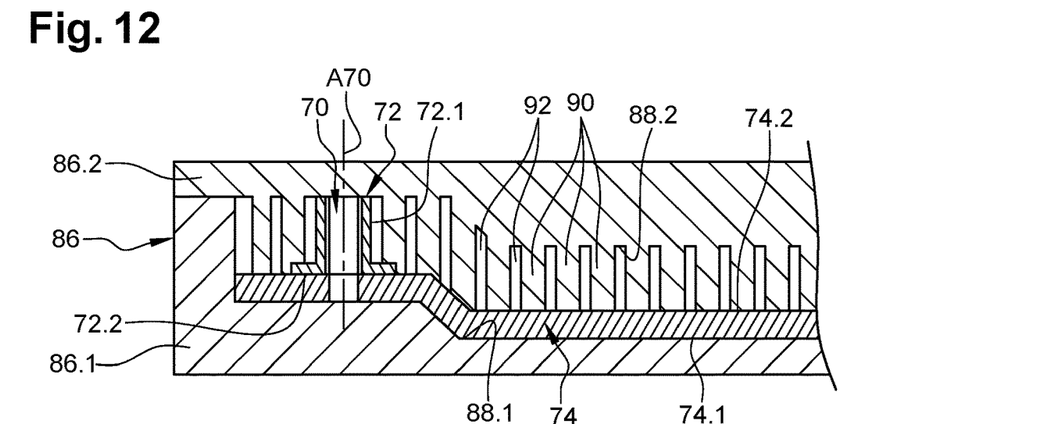
FIG. 12 is a cross section of a mold for carrying out a step of overmolding of a network of ribs illustrating an embodiment of the invention, before the injection of resin.

During the overmolding step, the first wall 74 is positioned in a mold 86 which has a first contact surface 88.1 against which the first face of the first wall 74 is pressed and a second contact surface 88.2 spaced apart from the second face 74.2 of the first wall 74 and shaped as the second face 82.2 of the network of ribs 76 to be obtained.

According to one configuration, the mold 86 comprises a first part 86.1 which has the first contact surface 88.1 and a second part 86.2 which has the second contact surface 88.2.

The mold 86 is configured to occupy an open state to allow the placement of the first wall 74, of the insert (or inserts) 72, 72' or to allow the first wall 74 provided with the overmolded network of ribs 76 to be removed from the mold and a closed state to carry out the overmolding step. In the closed state, the first and second parts 86.1, 86.2 of the mold 86 are in contact with one another so as to obtain a sealed enclosure in which the first wall 74 and the inserts 72, 72' are positioned. The mold 86 is configured to keep the insert (or inserts) 72, 72' immobile in contact against the second face 74.2 of the first wall 74.

The mold 86 comprises, for each cell 84, a die 90 protruding with respect to the second contact surface 88.2 and configured to come into contact with the first wall 74 upon the injection of the resin when the mold 86 is in the closed state. Thus, the second contact surface 88.2, the dies 90 and the first wall 74 delimit at least one cavity 92 corresponding to the network of ribs 76, as illustrated in FIG. 12.

During the overmolding operation, the resin is injected into the cavity (or cavities) 92 so as to obtain the network of ribs 76 by overmolding. The resin is injected so as to totally fill the cavity (or cavities) 92. The mold 86 comprises one or more resin injection points positioned appropriately to guarantee an optimal filling of the cavity (or cavities) 92. The first wall 74, the inserts 72 and/or the mold 86 are preheated or heated to promote the injection of the resin between the dies 90 and the adhesion of the network of ribs 76 on the first wall 74.

Figure 13:
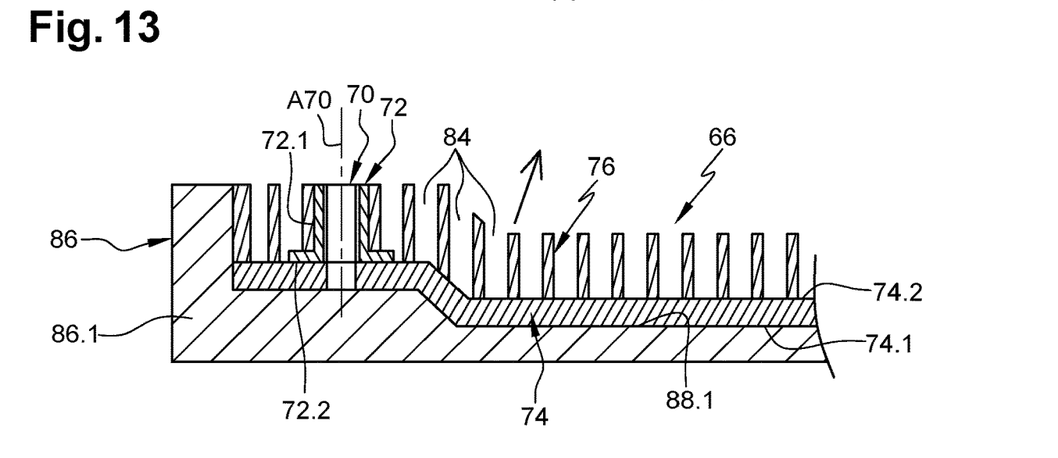
FIG. 13 is a cross section of the mold visible in FIG. 12 in a step of removal from the mold.

After the overmolding step, the method for manufacturing a door 62 comprises a step of removal from the mold, as illustrated in FIG. 13.

At the end of the overmolding step, the method for manufacturing a door 62 can comprise a step of cutting of the blade 66 to the desired length. To this end, the zone of the first wall 74 not covered by the network of ribs 76 is cut according to the desired length for the blade 66.

A method for manufacturing a door 62 comprising first and second walls 74, 78 comprises, in addition to the steps previously described, a step of obtaining of the second wall 78 and then a step of fixing of the second wall 78 against the network of ribs 76 and possibly the first wall 74, as illustrated in FIG. 15. According to one procedure, the second wall 78 is linked to the network of ribs 76 and to the first wall 74 by gluing. According to another procedure, during the step of fixing of the second wall 78, at least the second wall 78 and the network of ribs 76 are heated and the second wall 78 is pressed against at least the network of ribs 76. To this end, the first and second walls 74, 78 and the network of ribs 76 are heated and positioned between two plates shaped as the first and second faces Z1, Z2 of the blade 66 to be obtained.

The step of cutting of the blade 66 to the desired length can be performed before or after the step of assembly of the second wall 78.

The manufacturing method according to the invention makes it possible to manufacture a door of a thrust reversal system simply and economically while limiting the waste.

Unlike the doors made of composite material of the prior art, the manufacturing method of the invention makes it possible to obtain the through-orifice necessary for the articulation of the door when manufacturing the blade 66.

The fact of using a thermoplastic resin for the first or second wall 74, 78 makes it possible to obtain an adhesion of the network of ribs 76 that is reinforced by reactivating (by heating) the thermoplastic resin.

Finally, it is possible to modulate the mechanical characteristics of the blade 66 according to the configuration of the network of ribs 76.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing a door of a thrust reversal system of an aircraft, said door comprising a first wall with a first face configured to be in contact with an airstream to be deflected and a second face and a network of ribs positioned on the second face of the first wall, wherein the method comprises the steps of:
   obtaining of the first wall produced in at least one composite material comprising long fibers embedded in a thermoplastic resin matrix;
   producing at least one orifice passing through the first wall; and,
   overmolding of the network of ribs on the second face of the first wall by injecting at least one resin after the producing step, the network of ribs including at least one tubular metal insert.

2. The method of manufacturing as claimed in claim 1, wherein the network of ribs comprises a first face in contact with the first wall, a second face opposite the first face, and cells delimited by the ribs of the network of ribs and open on the first and second faces of the network of ribs, and
   wherein, during the overmolding step, the first wall is positioned in a mold comprising a first contact surface against which the first face of the first wall is pressed and a second contact surface spaced apart from the second face of the first wall and shaped as the second face of the network of ribs, and
   the mold comprising, for each cell, a die protruding with respect to the second contact surface and configured to come into contact with the first wall upon the injecting the at least one resin.

3. The method of manufacturing as claimed in claim 2, wherein the first wall, or the mold, or both are preheated or heated to promote the injecting the at least one resin between the dies and adhesion of the network of ribs on the first wall.

4. The method of manufacturing as claimed in claim 2, further comprising a step of:
   placing the at least one tubular metal insert in the mold prior to the overmolding step, the mold configured to keep the at least one tubular metal insert immobile.

5. The method of manufacturing as claimed in claim 1, further comprising a step of:
   thermoforming of the first wall before the overmolding step.

6. The method of manufacturing as claimed in claim 1, further comprising the steps of:
   obtaining a second wall, and
   fixing of the second wall against the network of ribs.

7. The method of manufacturing as claimed in claim 6, wherein the second wall is fixed against the first wall.

8. The method of manufacturing as claimed in claim 6, wherein the second wall is made of a composite material comprising long fibers embedded in a thermoplastic resin matrix, and wherein, during the step of fixing the second wall, at least the second wall and the network of ribs are heated and the second wall is pressed against at least the network of ribs.

9. The method of manufacturing as claimed in claim 1, wherein the at least one resin of the network of ribs is a thermoplastic resin and comprises at least one filler.

10. The method of manufacturing as claimed in claim 1, wherein the network of ribs clears a part of the second face of the first wall, and
wherein the method further comprises a step of:
cutting a zone of the first wall not covered by the network of ribs according to a desired length for the door.

11. The method of manufacturing as claimed in claim 1, further comprising:
a thermoforming step of shaping the first wall before the overmolding step by heating and positioning the first wall between two plates shaped according to the profile desired for the first wall.

12. The method of manufacturing as claimed in claim 1, wherein the first wall is porous and allows at least some acoustic waves to pass therethrough.

13. The method of manufacturing as claimed in claim 1, where the network of ribs includes a series of ribs forming an angle of +45° with respect to a lateral edge of the door.

* * * * *